United States Patent
Kim et al.

(10) Patent No.: US 10,277,021 B2
(45) Date of Patent: Apr. 30, 2019

(54) HOOK TERMINAL FOR VEHICLES

(71) Applicant: LG Innotek Co., Ltd., Seoul (KR)

(72) Inventors: Hunjung Kim, Seoul (KR); Minjung Shin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 2 days.

(21) Appl. No.: 15/337,736

(22) Filed: Oct. 28, 2016

(65) Prior Publication Data

US 2017/0043732 A1 Feb. 16, 2017

Related U.S. Application Data

(63) Continuation of application No. 13/307,949, filed on Nov. 30, 2011, now abandoned.

(30) Foreign Application Priority Data

Nov. 30, 2010 (KR) .................. 10-2010-0120291

(51) Int. Cl.
- *B60R 16/02* (2006.01)
- *H02G 3/32* (2006.01)
- *F16B 17/00* (2006.01)

(52) U.S. Cl.
CPC ........... *H02G 3/32* (2013.01); *B60R 16/0215* (2013.01); *F16B 17/006* (2013.01)

(58) Field of Classification Search
CPC ........ H02G 3/24; H02G 3/30; B60R 16/0207; B60R 16/0215

(Continued)

(56) References Cited

U.S. PATENT DOCUMENTS

| | | |
|---|---|---|
| 3,154,281 A | 10/1964 | Frank |
| 3,521,332 A | 7/1970 | Kramer |

(Continued)

FOREIGN PATENT DOCUMENTS

| | | |
|---|---|---|
| CN | 201075614 Y | 6/2008 |
| DE | 1973197 U | 11/1967 |

(Continued)

OTHER PUBLICATIONS

Office Action dated Aug. 16, 2013 in U.S. Appl. No. 13/307,949.

(Continued)

*Primary Examiner* — Jonathan Liu
*Assistant Examiner* — Guang H Guan
(74) *Attorney, Agent, or Firm* — Saliwanchik, Lloyd & Eisenschenk

(57) ABSTRACT

A hook terminal is disclosed, the terminal including: a hook unit formed with an upper side-opened fixing groove into which a cable of several strands can be inserted; a fixing unit integrally formed with a bottom side of the hook unit and fixed to a main body; a cable disengagement prevention unit formed at an upper end of the hook unit to inhibit the cable from being disengaged; and a plurality of pressure lugs formed at the hook unit to inhibit the cable from moving to an axial direction by applying pressure to an external surface of the cable, whereby the cable disengagement prevention unit fixing the cable by way of hot pressing work inhibits the cable of several strands from being disengaged and from moving to an axial direction.

6 Claims, 3 Drawing Sheets

(58) Field of Classification Search
USPC .......... 248/560, 561, 49, 56, 74.2, 74.5, 51, 248/68.1, 74.1, 71; D13/155; 219/56.21, 219/56.22
See application file for complete search history.

(56) References Cited

U.S. PATENT DOCUMENTS

| | | | | |
|---|---|---|---|---|
| 3,894,706 | A * | 7/1975 | Mizusawa | F16L 3/1025 |
| | | | | 248/68.1 |
| 4,084,877 | A | 4/1978 | Knickerbocker | |
| 4,163,372 | A | 8/1979 | Frye et al. | |
| 4,430,523 | A * | 2/1984 | Hayes | H01R 13/5812 |
| | | | | 174/135 |
| D275,174 | S * | 8/1984 | Rolli | F16B 7/0433 |
| | | | | D8/356 |
| 4,774,394 | A * | 9/1988 | Lemke | H01R 43/0221 |
| | | | | 219/121.6 |
| 4,843,707 | A | 7/1989 | Lake et al. | |
| 4,865,280 | A | 9/1989 | Wollar | |
| 4,943,183 | A | 7/1990 | Nakano | |
| 5,085,384 | A | 2/1992 | Kasubke | |
| 5,090,645 | A * | 2/1992 | Zuercher | F16L 3/223 |
| | | | | 174/166 R |
| 5,158,258 | A | 10/1992 | McFadzean | |
| 5,441,224 | A | 8/1995 | Ludwig | |
| D406,051 | S * | 2/1999 | Ross | F21V 19/0075 |
| | | | | D8/395 |
| 5,908,237 | A * | 6/1999 | Devir | F21V 19/0075 |
| | | | | 362/260 |
| 6,064,026 | A * | 5/2000 | Tkazyik | B23K 1/0004 |
| | | | | 219/56.21 |
| 6,405,414 | B1 * | 6/2002 | Byrnes | A61M 25/00 |
| | | | | 24/339 |
| 6,446,916 | B2 * | 9/2002 | Takeda | F16B 7/0433 |
| | | | | 248/74.1 |
| 6,682,025 | B2 * | 1/2004 | Turner | F16L 3/1041 |
| | | | | 248/49 |
| 6,865,087 | B2 | 3/2005 | Jelinger | |
| 6,936,785 | B2 * | 8/2005 | Oishi | H01R 43/0207 |
| | | | | 219/56.21 |
| 7,501,729 | B2 | 3/2009 | Takeuchi | |
| 7,758,197 | B2 * | 7/2010 | Choi | G02F 1/133604 |
| | | | | 362/219 |
| 7,823,282 | B2 | 11/2010 | Heinzel et al. | |
| 8,038,181 | B2 * | 10/2011 | Marschall | F16L 39/00 |
| | | | | 285/124.2 |
| 8,704,123 | B2 * | 4/2014 | Rosenkranz | B23K 9/235 |
| | | | | 219/121.64 |
| 2003/0152018 | A1 | 8/2003 | Medower et al. | |
| 2004/0150978 | A1 | 8/2004 | Jelinger | |
| 2008/0169386 | A1 | 7/2008 | Schnyder et al. | |
| 2008/0256761 | A1 * | 10/2008 | Bukoski | F16L 3/237 |
| | | | | 24/129 R |
| 2009/0321588 | A1 | 12/2009 | Sullivan | |
| 2012/0138753 | A1 * | 6/2012 | Kim | B60R 16/0215 |
| | | | | 248/68.1 |
| 2013/0037321 | A1 * | 2/2013 | Murata | B60R 16/0215 |
| | | | | 174/72 A |
| 2017/0043732 | A1 * | 2/2017 | Kim | B60R 16/0215 |

FOREIGN PATENT DOCUMENTS

| | | |
|---|---|---|
| DE | 8908932 U1 | 10/1989 |
| FR | 2578006 A1 | 8/1986 |
| WO | WO-2009/103417 A1 | 8/2009 |

OTHER PUBLICATIONS

Office Action dated Feb. 20, 2014 in U.S. Appl. No. 13/307,949.
Office Action dated Jan. 30, 2015 in U.S. Appl. No. 13/307,949.
Office Action dated Jun. 11, 2015 in U.S. Appl. No. 13/307,949.
Office Action dated Nov. 9, 2015 in U.S. Appl. No. 13/307,949.
Office Action dated Mar. 16, 2016 in U.S. Appl. No. 13/307,949.
Office Action dated Jul. 1, 2016 in U.S. Appl. No. 13/307,949.
European Search Report dated Dec. 18, 2012 in European Application No. 11191215.0.
Office Action dated Jun. 2, 2015 in Chinese Application No. 201110389681.1.

* cited by examiner

HOOK TERMINAL FOR VEHICLES

CROSS-REFERENCE TO RELATED APPLICATION

This application is a continuation of U.S. application Ser. No. 13/307,949, filed Nov. 30, 2011, which claims the benefit under 35 U.S.C. § 119 of Korean Application Number 10-2010-0120291, filed Nov. 30, 2010, which are hereby incorporated by reference in their entirety.

BACKGROUND OF THE DISCLOSURE

Field of the Disclosure

The present disclosure relates to a hook terminal configured to tie several strands of cable.

Discussion of the Related Art

Generally, cables on a vehicle or an electronic device for power connection are complicatedly wired. A cable fixing (tying) device is disposed for collecting complicated wirings and fixing the wirings to a support body.

A conventional cable fixing device largely uses an elastic clip secured to a main body side, where a cable of several strands is inserted into an insertion groove, and the cable is pressed using an elastic body to fix the several strands.

The conventional cable fixing device is problematic in that the elastic clip fixes the cable using an elastic force thereof to cause the cable to be disengaged from the elastic clip due to external shock. Another problem is that as the use time increases, the elastic force decreases to reduce a cable fixing power.

BRIEF SUMMARY

The present disclosure is directed to cope with the above-mentioned problems and to provide a hook terminal configured to firmly fix a cable and to inhibit the cable from moving to an axial direction.

Technical problems to be solved by the present disclosure are not restricted to the above-mentioned description, and any other technical problems not mentioned so far will be clearly appreciated from the following description by the skilled in the art.

In one general aspect of the present disclosure, there is provided a hook terminal, comprising: a hook unit formed with an upper side-opened fixing groove into which a cable of several strands can be inserted; a fixing unit integrally formed with a bottom side of the hook unit and fixed to a main body; a cable disengagement prevention unit formed at an upper end of the hook unit to inhibit the cable from being disengaged; and a plurality of pressure lugs formed at the hook unit to inhibit the cable from moving to an axial direction by applying pressure to an external surface of the cable.

In another general aspect of the present disclosure, there is provided a hook terminal, comprising, a hook unit formed at an upper side with an opening capable of inserting at least two cables, where the other end of the opening is formed with a fixing groove in which inserted cables are accommodated; a fixing unit integrally formed at a bottom side of the hook unit to be fixed at a main body when the main body is formed by injection molding; a disengagement prevention unit formed at a vicinity of the opening formed at the upper side of the hook unit to inhibit the cable from being disengaged; and a plurality of pressure lugs formed at an inner surface of a fixing groove of the hook unit to inhibit the cable from moving to an axial direction by applying pressure to an external surface of the cable.

A hook terminal according to the present disclosure has an advantageous effect in that the hook terminal is formed with a cable disengagement prevention unit fixing a cable by way of hot pressing work to inhibit the cable of several strands from being disengaged and to inhibit the cable from moving to an axial direction.

BRIEF DESCRIPTION OF THE DRAWINGS

The accompanying drawings, which are included to provide a further understanding of the present disclosure and are incorporated in the present disclosure and constitute a part of this application, and together with the description, serve to explain the principle of the disclosure. In the drawings.

DETAILED DESCRIPTION

Figure 1:
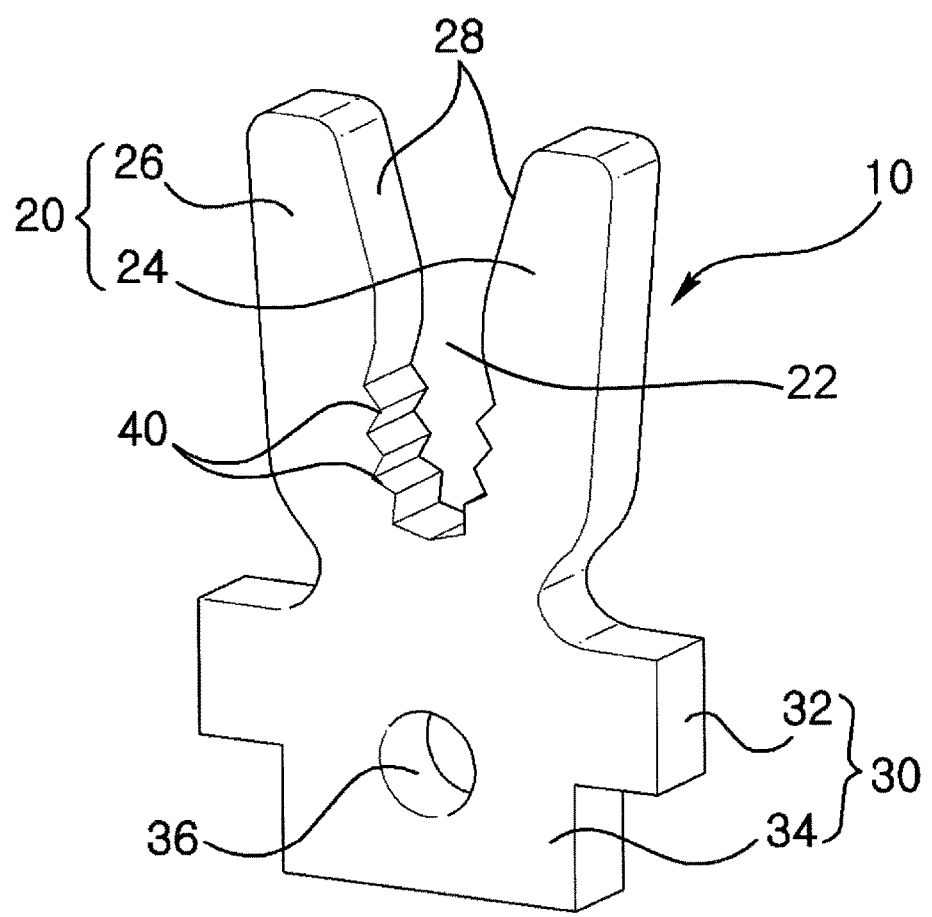
FIG. 1 is a perspective view illustrating a hook terminal according to a first exemplary embodiment of the present disclosure.

Advantages and features of the present disclosure may be understood more readily by reference to the following detailed description of exemplary embodiments and the accompanying drawings. Detailed descriptions of well-known functions, configurations or constructions are omitted for brevity and clarity so as not to obscure the description of the present disclosure with unnecessary detail. Thus, the present disclosure is not limited to the exemplary embodiments which will be described below, but may be implemented in other forms. In the drawings, the width, length, thickness, etc. of components may be exaggerated or reduced for the sake of convenience.

Furthermore, throughout the descriptions, the same reference numerals will be assigned to the same elements in the explanations of the figures, and explanations that duplicate one another will be omitted. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges from less than one percent to ten percent.

Figure 2:
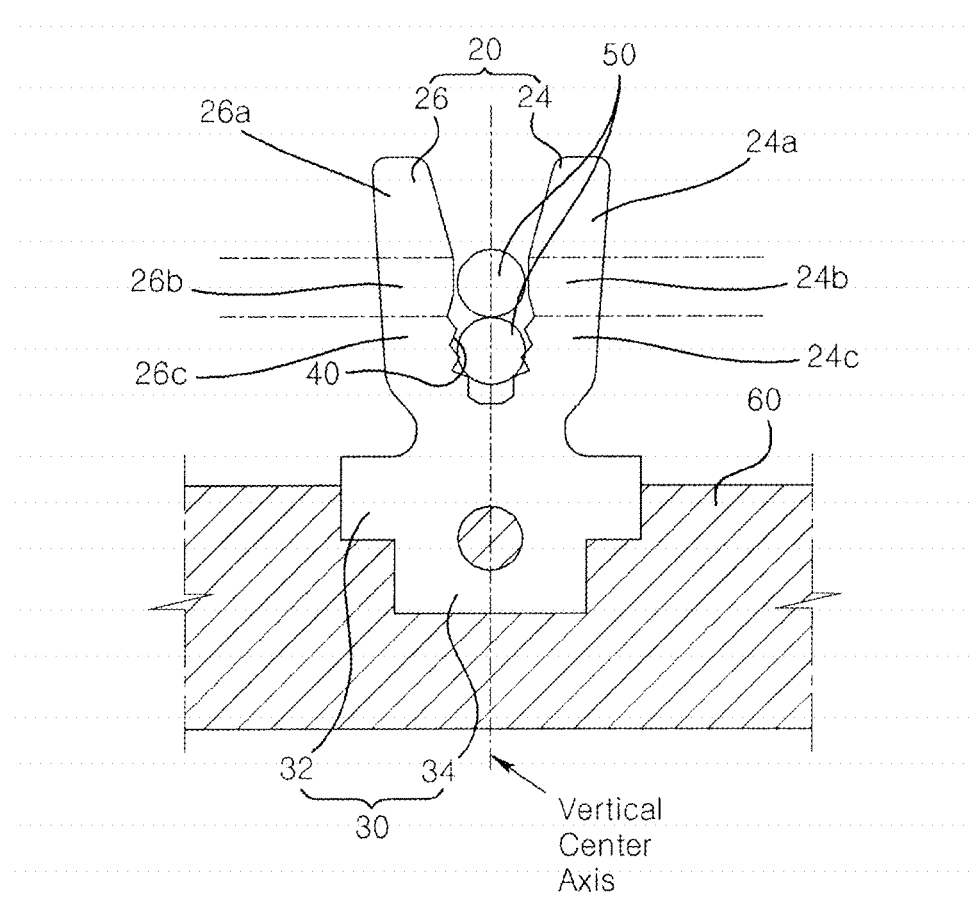
FIG. 2 is a perspective view illustrating a hook terminal inserted by a cable according to a first exemplary embodiment of the present disclosure.
Figure 3:
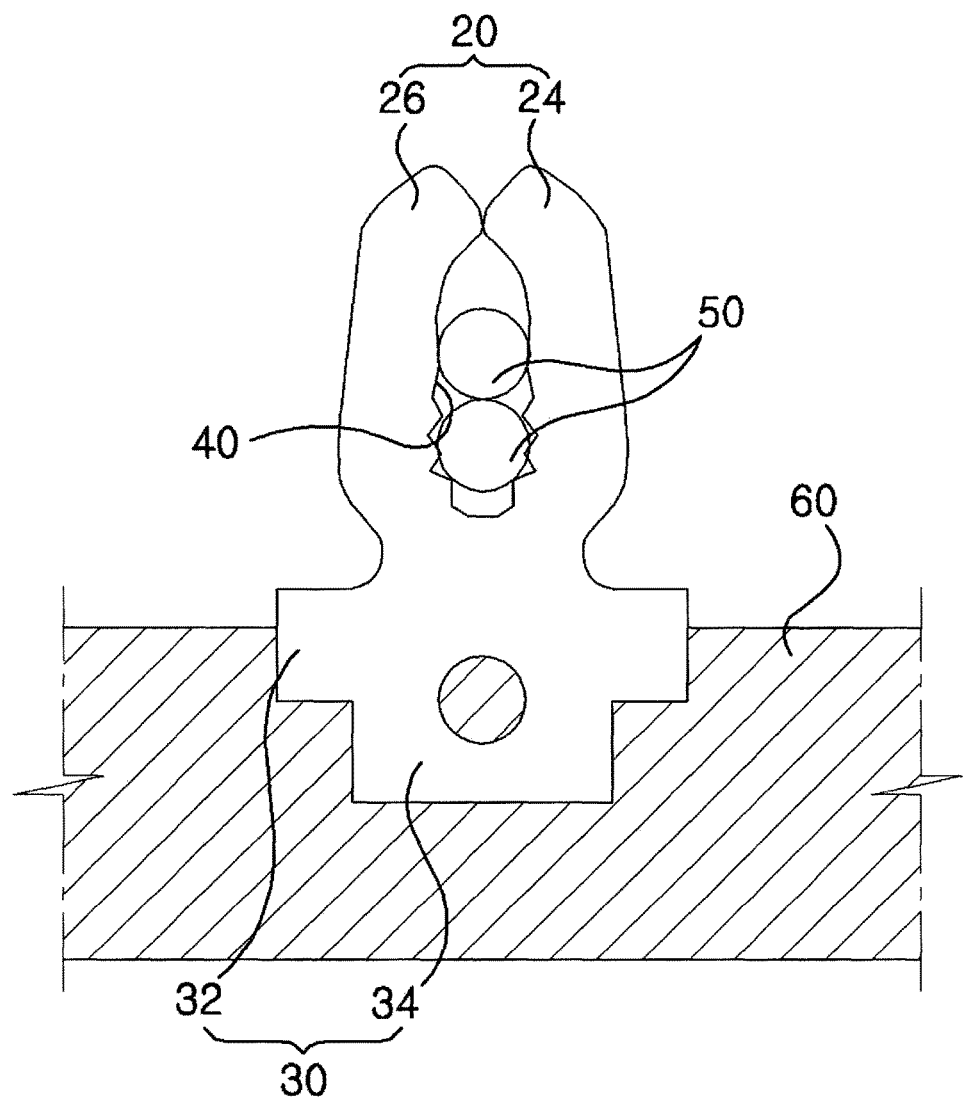
FIG. 3 is a lateral view of a cable being fixed by a hook terminal by way of hot pressing work according to an exemplary embodiment of the present disclosure.

FIG. 1 is a perspective view illustrating a hook terminal according to a first exemplary embodiment of the present disclosure, FIG. 2 is a lateral view illustrating a hook terminal inserted by a cable according to a first exemplary embodiment of the present disclosure, and FIG. 3 is a lateral view of a cable being fixed by a hook terminal by way of hot pressing work according to an exemplary embodiment of the present disclosure.

A hook terminal (10) according to an exemplary embodiment of the present disclosure may be largely used for vehicles, and also employed for other products than the vehicles including a product mounted with a plurality of cables for power connection.

Furthermore, a cable (50) may be applied to a power transfer wire in addition to the power connection purpose. The vehicles and electronic devices are mounted with a plurality of elements that need power, and the cable (50) is used for supplying power to each element. The cable (50) is secured to a main body with a gap formed at a mid section thereof to inhibit the cable (50) from rattling or clattering.

Under this circumstance, a hook terminal (10) according to an exemplary embodiment of the present disclosure is used to secure the cable of several strands.

The hook terminal according to an exemplary embodiment of the present disclosure includes a hook unit (20) formed with an upper side-opened insertion groove (22) into which a cable of several strands can be inserted; and a fixing unit (30) integrally formed with a bottom side of the hook unit (20) and fixed to a main body. The hook terminal (10) is preferably manufactured with a plastic that is injection molded.

The hook unit (20) includes first and second support pads (24, 26), each pad facing the other pad at a predetermined gap, and the insertion groove (22) is interposed between the first and second support pads (24, 26) to allow two or more cables to be inserted thereinto. An inner surface of the hook unit (20) faced by each of the first and second support pads (24, 26) is formed with an inclined surface (28) for easy insertion of cable (50).

As shown in FIG. 2, each of the first and second support pads (24, 26) includes an upper portion (24a, 26a), a middle portion (24b, 26b) and a lower portion (24c, 26c). The vertical center axis of the hook terminal is also shown.

Furthermore, the hook unit (20) includes a plurality of pressure lugs (40) formed at an inner surface of the lower portion (24c, 26c) of each of the first and second support pads (24, 26) to prevent the cable (50) from moving to an axial direction by applying pressure to an external surface of the cable (50).

That is, if an upper end of the hook unit (20) is deformed by hot press work while the cable (50) is inserted into the insertion groove (22) of the hook unit (20), the cable (50) can be prevented from being disengaged from the insertion groove (22) but cannot be inhibited from moving to an axial direction of the cable (50).

Each of the plurality of pressure lugs (40) is formed in the shape of a gear at an inner surface of the insertion groove (22) of the hook unit (20) to allow gear teeth to be meshed with an external surface of the cable and to apply pressure to the external surface of the cable (50).

Alternatively, each of the plurality of pressure lugs may be formed in a plurality of convex lugs on the inner surface of the insertion groove (22) to apply pressure to the external surface of the cable (50).

The shape of each pressure lug may take any shape as long as it is formed at the inner surface of the insertion groove of the cable (50) to apply pressure to the external surface of the cable (50).

The fixing unit (30) may be fixed to an injection molded body (60) mounted on a vehicle or an electronic device by way of double injection molding method. The fixing unit (30) includes a flange unit (32) accommodate to the injection molded body (60), and an insertion unit (34) that is inserted into the injection molded body (60), and a through hole (36) into which the injection molded body (60) is inserted when the injection molded body (60) is formed.

The fixing unit (30) may be formed by a bolt fastening or bonding method to a structure body in addition to the structure fixed by the double injection molding method.

Now, a cable fixing process of the hook terminal thus configured according to the exemplary embodiment of the present disclosure will be described.

Two or more cables (50) are inserted into the insertion groove (22) of the hook unit (20). At this time, the external surface of the cable is applied with pressure by the plurality of pressure lugs (40) formed at the hook unit (20).

Referring to FIG. 3, an upper end of the hook unit (20) is applied with pressure by hot press work, and is deformed to a direction, in which a portion of the upper distal end of each of the first and second support pads (24, 26) contacts each other, to complete the fixing job of the cable (50).

As noted above, the hook terminal is such that an upper end of the hook unit (20) is thermally deformed by hot press work to close an opened upper side of the insertion groove (22), whereby the cable (50) is inhibited from being disengaged from the hook terminal (10) by an external shock.

Furthermore, the plurality of pressure lugs (40) formed at the hook unit (20) applies pressure to the periphery of the cable (50) to inhibit the cable (50) from being moved to an axial direction of the cable (50).

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims.

What is claimed is:
1. A method of fixing a first cable and a second cable at a hook terminal,
wherein the hook terminal comprises a hook unit and a fixing unit for fixing the hook unit to a molded body,
wherein the hook unit comprises a first support pad and a second support pad spaced apart from the first support pad,
wherein each of the first and second support pads includes:
an upper portion;
a middle portion; and
a lower portion,
wherein a plurality of pressure lugs are disposed at the lower portion,
wherein an inner surface of the upper portion extends downwardly towards a vertical center axis of the hook terminal,
wherein an inner surface of the middle portion includes an upper part and a lower part, wherein the upper part of the inner surface of the middle portion extends downwardly from the inner surface of the upper portion and is substantially parallel to the vertical center axis of the hook terminal, wherein the lower part of the inner surface of the middle portion extends downwardly from the upper part of the inner surface of the middle portion and away from the vertical center axis of the hook terminal, wherein the upper part of the inner surface of the middle portion extends more steeply downward than each of the inner surface of the upper portion and the lower part of the inner surface of the middle portion, and wherein a vertical height of the upper portion is greater than a vertical height of the middle portion, wherein the method comprises:
  providing the hook terminal to be coupled with the molded body;
  inserting the first cable into an insertion groove defined by the first and second support pads;
  inserting the second cable over the first cable in the insertion groove, wherein a substantial part of the second cable is arranged in a middle region of the insertion groove, wherein the middle region of the insertion groove is defined by the inner surface of the middle portion of the first support pad and the inner surface of the middle portion of the second support pad; and
  deforming the upper portion of each of the first and second support pads by hot press work such that the upper portions of the first and second support pads are thermally deformed toward each other.

2. The method of claim 1, wherein, after the upper portions of the first and second support pads are deformed, an upper distal end of the upper portion of the first support pad is in contact with an upper distal end of the upper portion of the second support pad.

3. The method of claim 1, wherein a pitch of the plurality of pressure lugs of each of the first and second support pads is smaller than a diameter of the first cable.

4. The method of claim 1, wherein the hook unit is made of a thermally deformable material.

5. The method of claim 1, wherein each of the plurality of pressure lugs of each of the first and second support pads is formed in a tooth shape.

6. The method of claim 5, wherein each of the plurality of pressure lugs of each of the first and second support pads is configured to be meshed with an external surface of the first cable and to apply pressure to the external surface of the first cable.

* * * * *